US011900787B2

(12) United States Patent
Shoari et al.

(10) Patent No.: US 11,900,787 B2
(45) Date of Patent: *Feb. 13, 2024

(54) APPARATUS AND METHODS FOR HYGIENE MONITORING IN RESTAURANTS AND GROCERY SUPERSTORES

(71) Applicant: Arian Shoari, San Diego, CA (US)

(72) Inventors: Arian Shoari, San Diego, CA (US); Mona Komeijani, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/182,237

(22) Filed: Feb. 23, 2021

(65) Prior Publication Data

US 2021/0174665 A1    Jun. 10, 2021

Related U.S. Application Data

(63) Continuation-in-part of application No. 16/820,727, filed on Mar. 17, 2020, now Pat. No. 10,930,135.
(Continued)

(51) Int. Cl.
*G08B 21/24* (2006.01)
*H04B 17/23* (2015.01)
(Continued)

(52) U.S. Cl.
CPC .......... *G08B 21/245* (2013.01); *B65C 3/08* (2013.01); *B65C 9/40* (2013.01); *G01K 3/005* (2013.01); *G01K 13/00* (2013.01); *G06K 7/1413* (2013.01); *G06K 19/06028* (2013.01); *G06K 19/07758* (2013.01); *G08B 21/182* (2013.01); *G08B 21/24* (2013.01); *G08B 25/10* (2013.01); *H04B 17/23* (2015.01);

*H04B 17/318* (2015.01); *H04L 67/12* (2013.01); *H04M 1/0202* (2013.01); *H04Q 9/02* (2013.01); *H04W 4/023* (2013.01); *B65C 2009/408* (2013.01); *H04Q 2209/10* (2013.01);
(Continued)

(58) Field of Classification Search
CPC ...................................................... G08B 21/245
USPC .......................................................... 340/870.7
See application file for complete search history.

(56) References Cited

U.S. PATENT DOCUMENTS

| 2004/0100380 A1* | 5/2004 | Lindsay ............ G06K 19/0717 340/572.1 |
| 2004/0124988 A1* | 7/2004 | Leonard ........... G06K 19/07758 340/612 |

(Continued)

*Primary Examiner* — Fabricio R Murillo Garcia

(57) ABSTRACT

This disclosure describes four sub-systems for hygiene monitoring. The first one constantly monitors the temperature of working appliances to be in predefined range. The second one uses a combination of temperature, humidity, UV and gas detectors to monitor the environment. The third sub-system uses a combination of RF tags, RF tag readers and infrared/proximity/motion/microphone/touch sensors to monitor if the staff wash their hands properly. The fourth sub-system automatically generates food expiring label for opened food containers. The system generates and print the label whenever a staff wearing an RF tag gestures her/his tag or scans the container bar code or selects container food type from a drop-down menu on its touch screen. The fourth sub-system can also monitor the inventory of opened cans of food in the refrigerator and provide a report or alert when they the time gets close to expiration date.

19 Claims, 12 Drawing Sheets

Related U.S. Application Data which is a continuation of application No. 16/093,635, filed as application No. PCT/IB2017/001021 on Apr. 13, 2017, now Pat. No. 10,593,188.

(60) Provisional application No. 62/321,906, filed on Apr. 13, 2016.

(51) Int. Cl.

| | | |
|---|---|---|
| *H04B 17/318* | (2015.01) | |
| *G08B 21/18* | (2006.01) | |
| *H04M 1/02* | (2006.01) | |
| *H04W 4/02* | (2018.01) | |
| *B65C 3/08* | (2006.01) | |
| *B65C 9/40* | (2006.01) | |
| *G01K 3/00* | (2006.01) | |
| *G01K 13/00* | (2021.01) | |
| *G06K 7/14* | (2006.01) | |
| *G06K 19/06* | (2006.01) | |
| *G06K 19/077* | (2006.01) | |
| *H04L 67/12* | (2022.01) | |
| *H04Q 9/02* | (2006.01) | |
| *G08B 25/10* | (2006.01) | |

(52) U.S. Cl.
CPC ... *H04Q 2209/40* (2013.01); *H04Q 2209/823* (2013.01); *H04Q 2209/826* (2013.01); *H04Q 2209/84* (2013.01); *H04Q 2209/883* (2013.01)

(56) References Cited

U.S. PATENT DOCUMENTS

| | | | |
|---|---|---|---|
| 2006/0119484 A1* | 6/2006 | Chishima | G01F 23/2845 340/539.1 |
| 2010/0106626 A1* | 4/2010 | Ashrafzadeh | G06F 16/355 705/28 |
| 2014/0292518 A1* | 10/2014 | Wildman | G16H 50/80 340/573.1 |
| 2015/0161874 A1* | 6/2015 | Thyroff | G08B 21/245 340/539.11 |
| 2015/0216369 A1* | 8/2015 | Hamilton | G08B 21/245 222/23 |
| 2017/0270474 A1* | 9/2017 | McCoy | G06Q 50/22 |

* cited by examiner

FOOD GUARDIAN $Nr$ is the number of receiver antennas
$Mt$ is the number of transmitter antennas

| STAFF NAME | | |
|---|---|---|
| Tom | ☒ | 🍲 |
| Jackie | ☒ | 🍴 |
| Adrian | ☐ | 🍴 |
| Ali | ☒ | 🍲 |
| Amanda | ☒ | 🧺 |
| philip | ☒ | 👨‍🍳 |

APPARATUS AND METHODS FOR HYGIENE MONITORING IN RESTAURANTS AND GROCERY SUPERSTORES

CROSS REFERENCE TO RELATED APPLICATIONS

This application claims the benefit of U.S. Provisional Application No. 62/321,906 filed on Apr. 13, 2016, and U.S. Non-Provisional application Ser. No. 15/396,493 filed on Dec. 31, 2016, and PCT application PCT/IB17/01021 filed on Apr. 13, 2017, and U.S. Non-Provisional application Ser. No. 16/093,635 filed on Oct. 13, 2018, and U.S. Non-Provisional application Ser. No. 16/820,727 filed on Mar. 17, 2020, the contents of which are incorporated by reference herein.

COPYRIGHT NOTICE

Some parts of the disclosure of this patent document contain materials that are subject to copyright protection. The owner of the copyright has no objection to the facsimile re-production of this disclosure by anyone as it appears in the Patent and Trademark Office Patent file or records, but otherwise reserves all copyright.

BACKGROUND OF THE INVENTION

According to a CDC report, every year, around 48 million people get sick from a food-borne disease in the United States, from which 128,000 are hospitalized and almost 3,000 people die. The most common food-borne disease agent is the Norovirus which accounts for almost 40% of all outbreaks. When a food related incident happens in one branch of a franchise chain, not only that unit will be penalized by health authorities, but also the entire brand will bear severe losses due to loosing customer confidence. Up until now, no technological solution has been introduced to allow the headquarters to monitor hygiene compliance among their franchise units.

One of the main concerns regarding food hygiene in restaurants and any food processing center is to ensure that the temperature of the appliances and food containers stays at the recommended level (defined by Department of Health). Currently these data is being logged and recorded manually by the staff of the food processing organization. However, this is not only subject to human error but it is also difficult for high level managers to supervise the process. Accordingly, there is a need for a centralized monitoring and control system to log this data and provide a real-time warning in case a temperature falls beyond the acceptable range.

Another source of concern regarding food safety is the hygiene among the staff of the restaurants. For example, there are hand-washing codes dictated by the health organization that the staff should follow. In addition, the staff should not attend the work space if they are ill and have a fever. Unfortunately, at the moment there is no automatic mechanism to monitor staff compliance with these codes without violating their privacy. Restaurants currently rely on the honesty of the staff to report them.

Moreover, the environment temperature and humidity shall be controlled in a restaurant kitchen to make sure that the environment is not suitable for growth of bacteria and fungus.

Furthermore, another issue regarding food safety is the proper labeling of the opened cans and raw meat in the refrigerator. That's because the expiration time of a food product will change whenever the can or container is opened. On the other hand, the raw material or meat may not be used all at once upon opening of the container and the left over may be kept in the refrigerator for future use by another employee. Since this employee may not be the one who originally opened the container, it may be hard for he or she to determine how old the can ingredient is. At the moment, there are certain procedures in place for manual food labeling by the staff, but they may forget to label the opened cans. This can happen due to work pressure, stress or even confusion on calculating the expiration date based on the type of ingredient.

This patent application will address all these issues separately and provide hygiene monitoring sub-systems that can be used by managers to get real-time feedback about the level of compliance with food safety codes in each remote franchise unit. Needless to say, that each sub-system may be implemented individually or in combination to other sub-system to provide cost effective solution based on customer requirements.

Our combined system can help managers of chain restaurants and grocery super-stores to remotely monitor the level of hygiene compliance among the franchise units; promote a good reputation among their patrons; reduce the risk of contamination, fines, and lawsuits; get real time feedback that allows immediate correction; reduce maintenance costs by identifying the need for service sooner; and reduce the insurance premium related to "accidental contamination" clause by proving the business is highly monitored.

SUMMARY OF THE INVENTION

This application describes apparatus and methods for hygiene monitoring in chain restaurants and grocery super-stores. The system contains 4 sub-system each of them may be implemented separately or combined with other sub-systems and monitor different aspects of food safety. One of the sub-system includes: measuring temperature by plurality of thermometer or thermostat, transferring the data regarding the temperature inside appliances, heaters, coolers, refrigerator to a central monitoring unit; setting predefined value range for healthy functionality of each heating, cooling, appliances unit; reporting or alarming if the temperature falls out of range for a specific period of time. The other sub-system does similar thing for temperature of the environment in addition to storing data and generate alarm based on humidity/gas and other environment related sensors. The third sub-system track the location of staff in the environment and check their compliance with hand-washing policy of the organization. The forth subsystem generate automatic food labels for opened cans based on RF tag worn by the staff.

DETAILED DESCRIPTION

The present invention provides a system and methods to constantly monitor (and/or control) the level of compliance with key hygiene criteria in restaurants, grocery super stores, franchise units, hotels and resorts, and other food processing factories.

Our total monitoring system comprises of one or more of the following sub-systems. Any combination of following sub-systems may be employed to design the total hygiene monitoring system depends on customer requirements and application economy. Alternatively, any sub-system may be employed individually as a separate monitoring system.

Following is the list of sub-systems:
A) Appliance monitoring sub-system.
B) Environment monitoring sub-system.
C) Staff monitoring sub-system.
D) Automatic food labeling sub-system.

Figure 1:
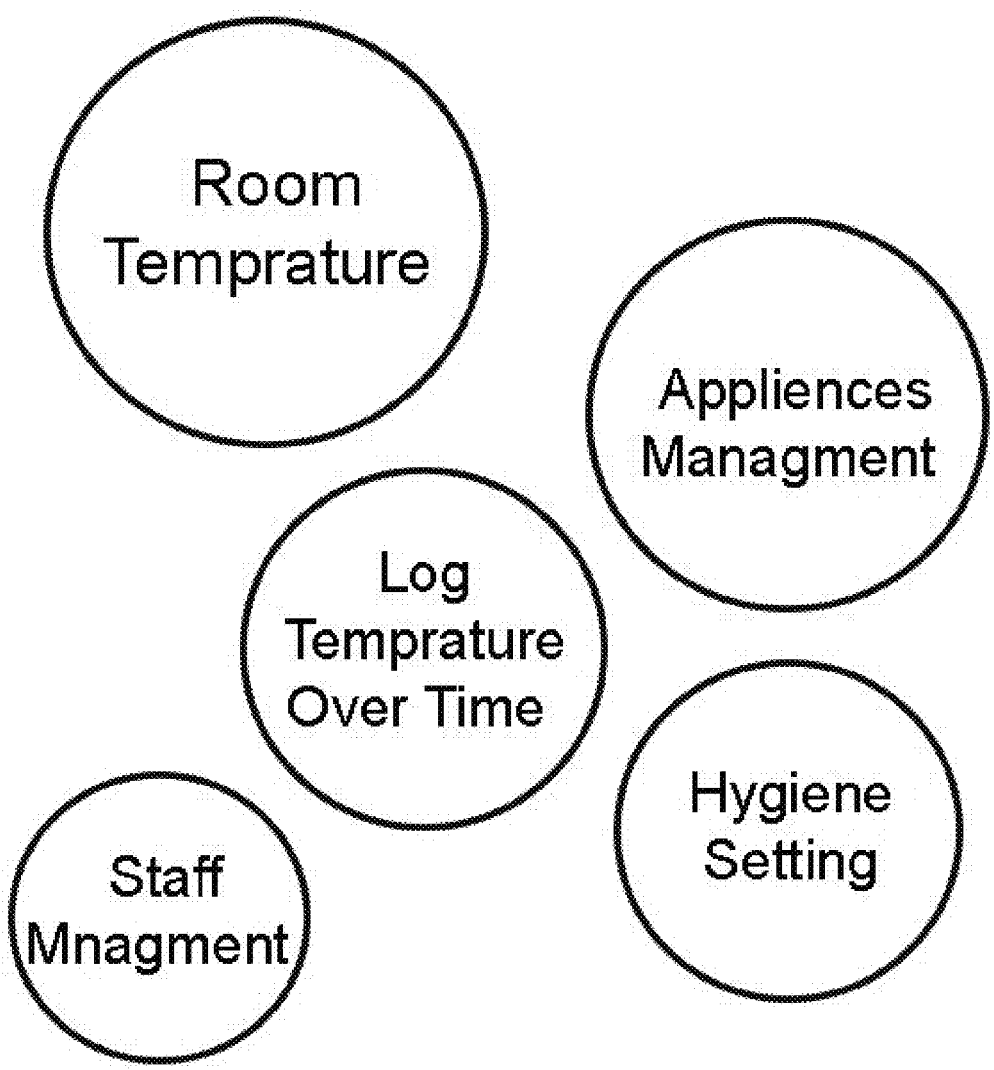
FIG. 1: Different sub-systems of hygiene monitoring system

FIG. 1 shows different parts of a total hygiene monitoring solution.

A) Appliances Monitoring Sub-System.

Two common sources of food contamination in restaurants or any other food processing facilities are appliances not maintaining a healthy temperature, or the meat being kept outside hot/cold zone for more than 2 hours. To address these issues, certain procedures are in place to measure and record the appliances' temperatures but the process is manual and time-consuming and sometimes the staff forget to follow these procedures, therefore, we hereby propose an Internet of Things (IoT) solution which gather useful sensors data and store them in a central application that can both generate real-time alerts or log the history for future reference. The system optionally may contain mechanisms to control the temperature or change settings of the appliances by accessing their microcontroller through the internet remotely.

Figure 2:
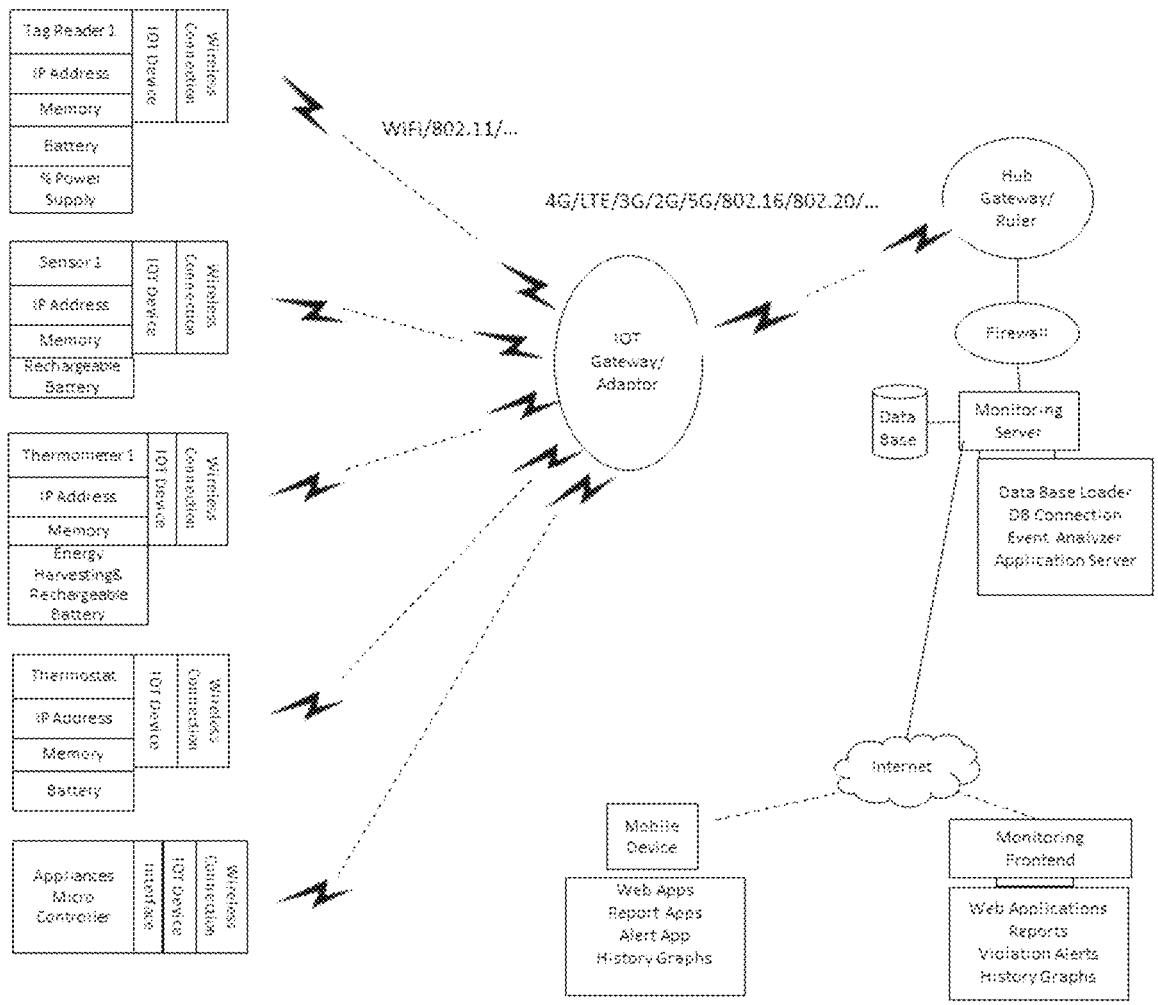
FIG. 2: A system overview of the hygiene monitoring system

The "appliances monitoring sub-system" comprises a plurality of temperature sensors (or thermostats) installed on the restaurants' appliances such as refrigerators, freezers, ovens, stoves, grills, heaters, warmers, dish-washers, ice-makers, soft drink mixers and dispensers, ice cream dispensers, coffee makers, toasters, fryers, etc.; plurality of interfaces to read the sensors data and possibly log them in an attached on-chip memory; an Internet of Things (IoT) adaptor unit (or a wireless router, hub, switch or gateway) that receives the data from all sensors and organize them in a packet format to be sent to a central unit; wireless connections between sensor units and internet of Things (IoT) adaptor unit (or a wireless router, hub, switch or gateway); and a central unit which can be located on a remote server which keeps the hygiene monitoring information from all restaurants' branches. A high level design of the sub-system has been illustrated in FIG. 2.

In another embodiment, instead of using separate temperature sensors for appliances, the system employs smart interfaces to read and download data directly from appliances microcontrollers (for example the one used in ovens or refrigerators).

The sub-system gathers useful data from all appliances and store them in a database located in the central monitoring unit. Therefore, the central monitoring unit captures an informative snapshot of all appliances and room temperatures in any restaurant unit. The reports would be available in real-time to franchise headquarters and possibly on the managers' smartphones. The system can also provide real-time alerts whenever the temperatures are not set correctly or when there is a failure in an appliance. Hence, the system is also useful in decreasing the maintenance cost and energy consumption.

In another embodiment, instead of a central unit installed on a remote server, each restaurant unit has its own franchise monitoring unit which will handle all monitoring task for that specific unit and optionally transmit reports or feedback to the central monitoring unit which is installed in a separate location.

The Internet of Things (IoT) adaptor unit can act as a gateway to collect data and transmit them over a mobile wireless network.

The Internet of Things adaptor may be compatible with mobile standards such as 5G, 4G, LTE, 3GPP, Bluetooth, BTLE, Zigbee, Glowpan, GPRS, or GSM Edge.

The Internet of Things adaptor may also be compatible with communication standards defined for wireless Local Area Network (LAN), wireless Metropolitan Area Network (MAN), wireless Regional Area Networks (RAN) and/or wireless Broadband Wireless Access (BWA) including different versions of IEEE 802.11, IEEE 802.15, IEEE 802.16, IEEE 802.20 and IEEE 802.22, WiFi, WiMax and etc.

Figure 3:
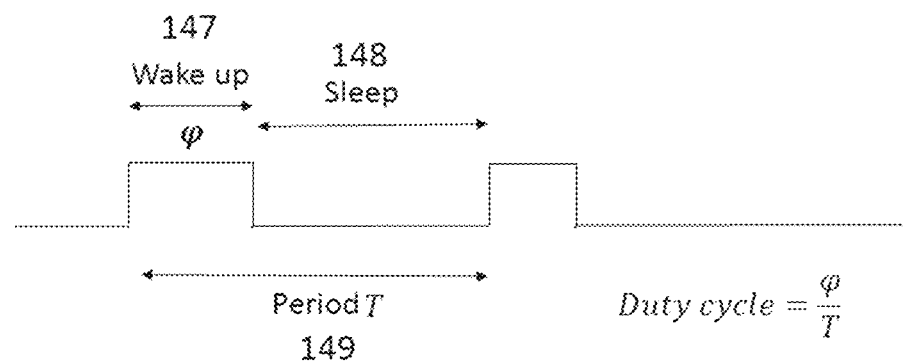
FIG. 3: Wakeup-sleep cycles and relevant parameters

In one embodiment, the temperature sensors installed on appliances may become enabled based on an adjustable duty cycle on a periodic basis. This helps the sensor device save energy on the sleep cycle as demonstrated in FIG. 3. The duty cycle and period of wakeup-sleep may be different for different type of sensors. In addition, these parameters may adaptively be controlled through a feedback from the device battery. This may help the battery require less frequent charging.

In one embodiment, the central database is co-located with the central control unit and stores all raw data from the sensors. Alternatively, the application server may analyze the data and stores the useful information or aggregated data in the database.

In one embodiment, the temperature sensors have on-chip memories that store different temperature values in a specific period of time. These values will be sent to the Internet of Things (IoT) adaptor unit (or a wireless router, hub, switch or gateway) periodically or upon some event to save energy on the data transmission and to ensure successful delivery of data. For example, a temperature sensor inside the refrigerator may be programmed to store the temperature history from previous transmission and send it on a burst of communication whenever the refrigerator's door is open.

In addition, the application may be developed using readily available IoT platforms such as ThingSpace, ThingShadow, OpenXC or etc.

Figure 4:
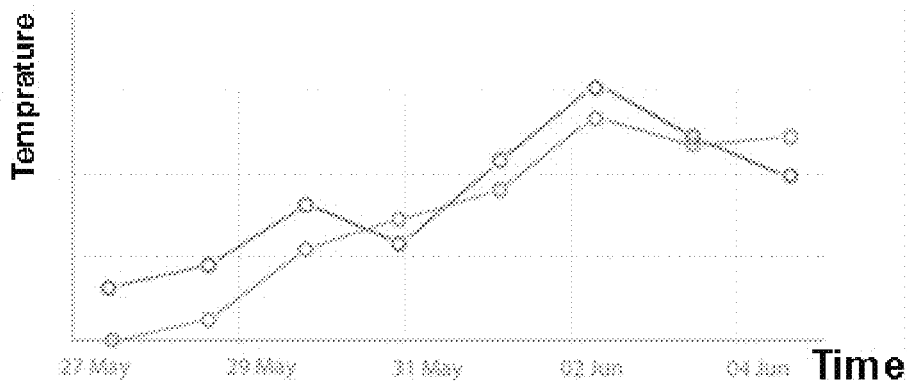
FIG. 4: A history graph of appliances' temperatures during a specified period
Figure 4:
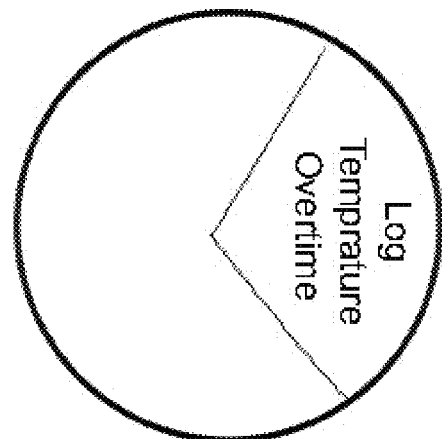

Allowed temperature range for each appliance may be set by monitoring staff based on the appliance's manual and in accordance with hygiene codes dictated by federal or state health organizations. The system will generate an alert if the appliances is on for a preset duration of time and the temperature is not stabilized in the allowed range. It may also generate history graphs of each appliance's temperature over time. Alternatively, these graphs may show the average number of violations per day. FIG. 4 shows a user interface design for graphical illustration of appliances' temperatures history during a specified period.

The reports regarding each restaurant unit would be available real-time in franchise headquarters. The system can also provide real-time alert whenever the temperature is not set correctly or when there is a failure in the appliances. Hence, the system is also useful to decrease maintenance costs and to ensure that equipment is running effectively.

Optionally, the changes in current and voltage of the appliances may be measured and transmitted to the central unit through the Internet of Things adaptor. This data may be analyzed and used in central monitoring unit to identify a possible failure in the system or the need for a maintenance inspection.

The system may optionally send alert or report to managers' smartphone on a real time basis through short message service (SMS) offered by mobile operators.

One skillful in the arts would know that similar techniques and apparatus can be used to monitor food safety in any other organization dealing with food preparation or processing including food markets and superstores, catering facilities, food factories, bakeries, fast food chains, day care kitchens, hospital kitchens, nursery kitchens, and so on.

B) Environment Monitoring Sub-System.

Environment monitoring sub-system is comprised of a plurality of temperature and humidity sensors installed in different locations of the restaurant including the kitchen, the dining room, the bar table, the buffet table, etc.; plurality of interface to read the sensors data and possibly log them in an attached on-chip memory; an Internet of Things (IoT) adaptor unit (or a wireless router, hub, switch or gateway) that receive the data from all sensors and organize them in a packet format to be sent to a central unit; wireless connections between sensor units and IoT adaptor unit (or a wireless router, hub, switch or gateway); and a central unit which can be located on a remote server which keeps the hygiene monitoring information from all restaurant branches.

The system may optionally include CO, CO2, CH4, O2, O3, Chlorine and UV sensors to provide feedback and alerts regarding the quality of the air, and possible exposure to harmful sun radiation or toxic material.

The sub-system gathers useful data from different parts of the facility and store them in a database located in the central monitoring unit. Therefore, the central monitoring unit captures an informative snapshot of the room temperatures and humidly in any part of the restaurants' units. This data is useful to keep the environment incompatible with bacteria and fungus growth. In addition, it may optionally provide feedback regarding the quality of the air in the facility or revealing poisoning gases such as CO.

In one embodiment, the central database is located in the central control unit and stores all raw data from the sensors. Alternatively, the application server may analyze the data and only stores the useful information or aggregated data in the database.

The reports would be available in real-time to franchise headquarters and possibly on the managers' smartphones.

The system can also provide real-time alerts whenever the temperatures are not set correctly or when there is a failure in an HVAC or Heating system. Hence, the system is also useful in decreasing the maintenance cost and energy consumption.

In another embodiment, instead of a central unit installed on a remote server, each restaurant unit would have its own franchise monitoring unit. This unit would handle all monitoring tasks for that specific unit and optionally transmit reports or feedback to the central monitoring unit installed in a remote location.

The Internet of Things adaptor may be compatible with mobile standards such as 5G, 4G, LTE, 3GPP, Bluetooth, BTLE, Zigbee, Glowpan, GPRS, or GSM Edge.

The Internet of Things adaptor may also be compatible with communication standards defined for wireless Local Area Network (LAN), wireless Metropolitan Area Network (MAN), wireless Regional Area Networks (RAN) and/or wireless Broadband Wireless Access (BWA) including different versions of IEEE 802.11, IEEE 802.15, IEEE 802.16, IEEE 802.20 and IEEE 802.22, WiFi, WiMax and etc.

In addition, the application may be developed using readily available IoT platforms such as ThingSpace, ThingShadow, OpenXC, etc.

Acceptable temperature range for each environment may be set by monitoring staff in accordance to hygiene guidelines provided by health organizations. The system will generate alerts if the room temperature falls beyond the preset values during or after working hours. It may also generate historical graph for temperature or humidity of each room. Alternatively, it may show the average number of violations per day.

The reports regarding each restaurant unit would be available real-time in franchise headquarters. The system can also provide real-time alerts whenever the temperature is not set correctly or when there is HVAC or heating system. Hence, the system is also useful to decrease maintenance costs and insure that ventilation system is running effectively.

Figure 5:
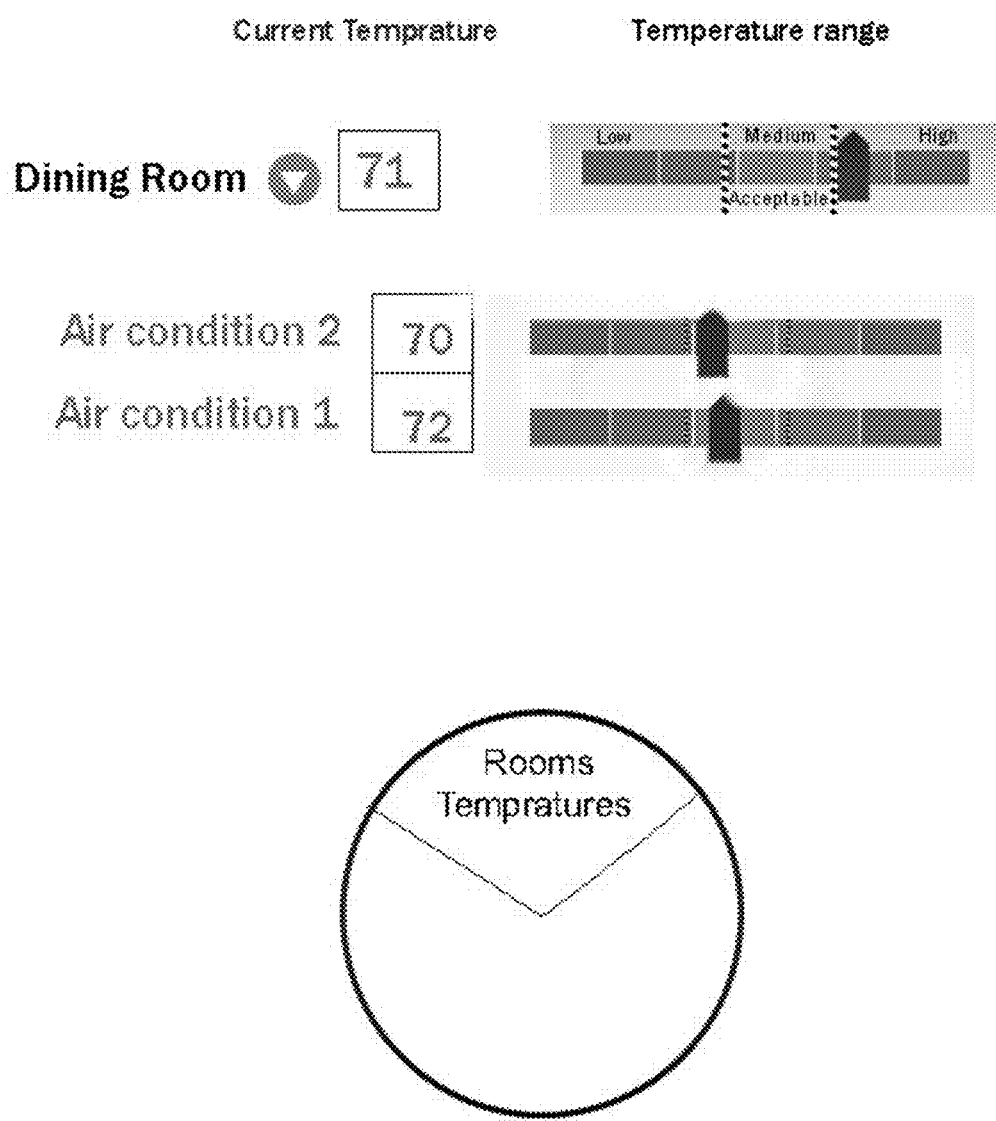
FIG. 5: Temperature monitoring of the environment

FIG. 5 shows a user interface design for temperature monitoring of the environment.

The environment monitoring sub-system may optionally employ smart plates and smart glasses. These plates have temperature and infrared or UV sensors attached to them. The sensors enable them to sense if they are empty and inform the waiter/waitress to ask the patron if she/he needs a refill. In addition, it may record and report the amount of time between the full plate leaving the kitchen hot zone and arriving at the table. The system may optionally give a warning if the full plate is outside hot/cold zone for a specific period of time. In addition, it may optionally monitor temperature of the food on the plate.

In one embodiment, the sensors installed in the environment may become enabled based on an adjustable duty cycle on a periodic basis. This helps the sensor device to save energy on the sleep cycle as demonstrated in FIG. 3. The duty cycle and period of wakeup-sleep may be different for different types of sensors. In addition, these parameters may adaptively be controlled through a feedback from the device battery. This may help the battery require less frequent charging.

In one embodiment, environment sensors have on-chip memories that store their measured values in a specific period of time. These values will be sent to the Internet of Things (IoT) adaptor unit (or a wireless router, hub, switch or gateway) periodically or upon some event to save energy on the data transmission and to ensure successful delivery of data. For example, a CO or a humidity sensor may be programmed to store its measurements from previous transmission and only send it whenever the current measured value is over some threshold or whenever its buffer becomes full. In another example, a temperature sensor installed on the buffet table may start transmitting the temperature stored value if its buffer becomes full or the temperature falls beyond the acceptable range.

In addition, the data from the buffer may be transmitted to the central unit on a burst of communication to save energy on the transmission.

The environment monitoring sub-system may be combined with appliance monitoring sub-system to provide a more comprehensive feedback to the managers and certified food safety managers.

The system may optionally send alert or report to managers' smartphone on a real time basis through short message service (SMS) offered by mobile operators.

One skillful in the arts knows that similar techniques and apparatus can be used to monitor food safety in any other organization dealing with food preparation or processing including food markets and superstores, catering facilities, food factories, bakeries, fast food chains, day care kitchens, hospital kitchens, nursery kitchens and so on.

C) Staff Monitoring Sub-System.

This sub-system contains methods for automatically checking the staff compliance with hand-washing codes defined by health organizations in restaurants and food processing facilities without jeopardizing anyone's privacy.

In chain restaurants and grocery stores. Although there are certain procedures and guidelines in place to follow food safety regulations, they do not have any tangible mechanisms to guarantee fulfillment of those guidelines in a single franchise other than random inspections. So the same sub-system would benefit restaurantours to have more control over their branches' food processing and hygiene.

The sub-system comprise of radio frequency tags or beacons worn by organization staff (for example RFiD or Bluetooth Tags); a plurality of RF tag readers or base-stations installed on different locations in the restaurant; infrared/proximity/motion/microphone/sonar touch sensors installed over the faucet and dispenser; an Internet of Things (IoT) adaptor or gateway unit (or a wireless router, hub, switch or gateway) that receives the data from all sensors and organize them in a packet format to be sent to a central unit; wireless connections between RF tag readers or sensor units and Internet of Things (IoT) adaptor unit (or a wireless router, hub, switch or gateway); a central unit which can be located on a remote server which keeps the hygiene monitoring information from all restaurants branches in a database; and the algorithm and applications which allow owners of restaurants to monitor the hygiene compliance in each individual franchise.

The staff were supposed to wear radio frequency tags which would be used to identify their movements in the unit. The system generates a flag whenever the employee leaves kitchen station or goes to the restroom and will not clear the flag unless that person stands behind the faucet for a specific period of time, uses the dispenser, and rubs her/his hands properly.

In one embodiment, these radio frequency tags can be worn on the users' shoe (either built into the shoe, built into the insole, or attached to the exterior of the shoe). Several tag reader units would be installed on each specific area of interest, for example kitchen, restaurant's dining room, restroom area and in front of the faucets. The tag readers may be installed on the ground or close to the ground to make the distance between RF tags and reader independent from the height of the person. Several infrared units will be installed on the faucet and dispenser. These units have small signal processing/microcontroller chips attached to them which can calculate other data like the duration that the faucet was open and report it to the central monitoring system through the IoT adaptor (or a wireless router, hub, switch or gateway).

In one embodiment, the central database is located in the central control unit and stores all raw data from the sensors. Alternatively, the application server may analyze the data and only stores the useful information or aggregated data in the database.

Figure 6:
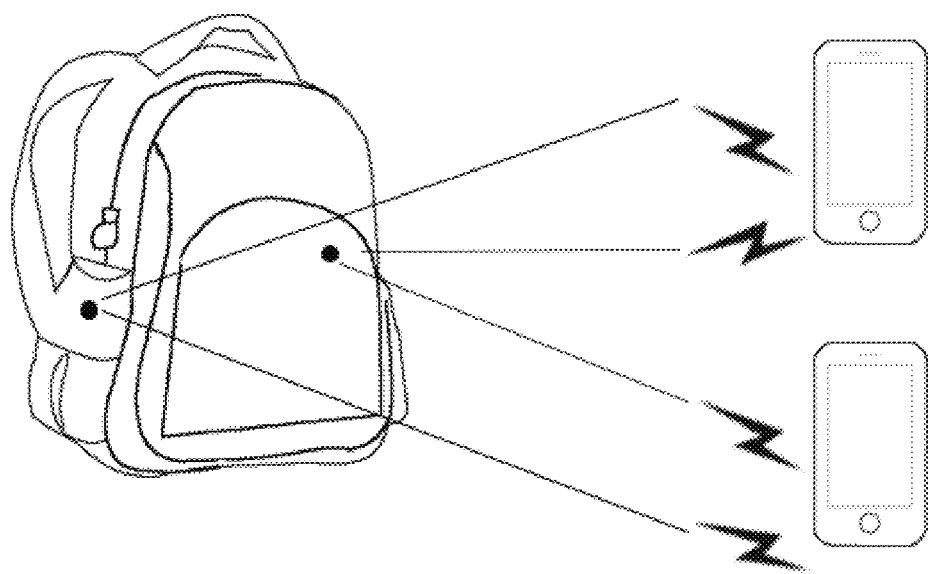
FIG. 6: An object localizer system employing two closely attached beacons and two base-stations (smartphones). The base-stations share data with each other to improve accuracy of location estimation.

In an alternative embodiment the data received from RF beacons at base stations will be used to localize and track the employee movement in the organization. This data may be used in conjunction with the map of the unit to identify and log which room has been visited by the user and when. The localization may be done through, for example, measuring received signal strength indicator (RSSI) of the RF beacon in multiple fixed base stations installed around the facility (FIG. 6), normalizing the values with the transmit power of the beacon, querying an RSSI-distance mapping database to estimate the distance of the user from each fixed base station, and using trilateration/multilateration techniques.

Figure 7:
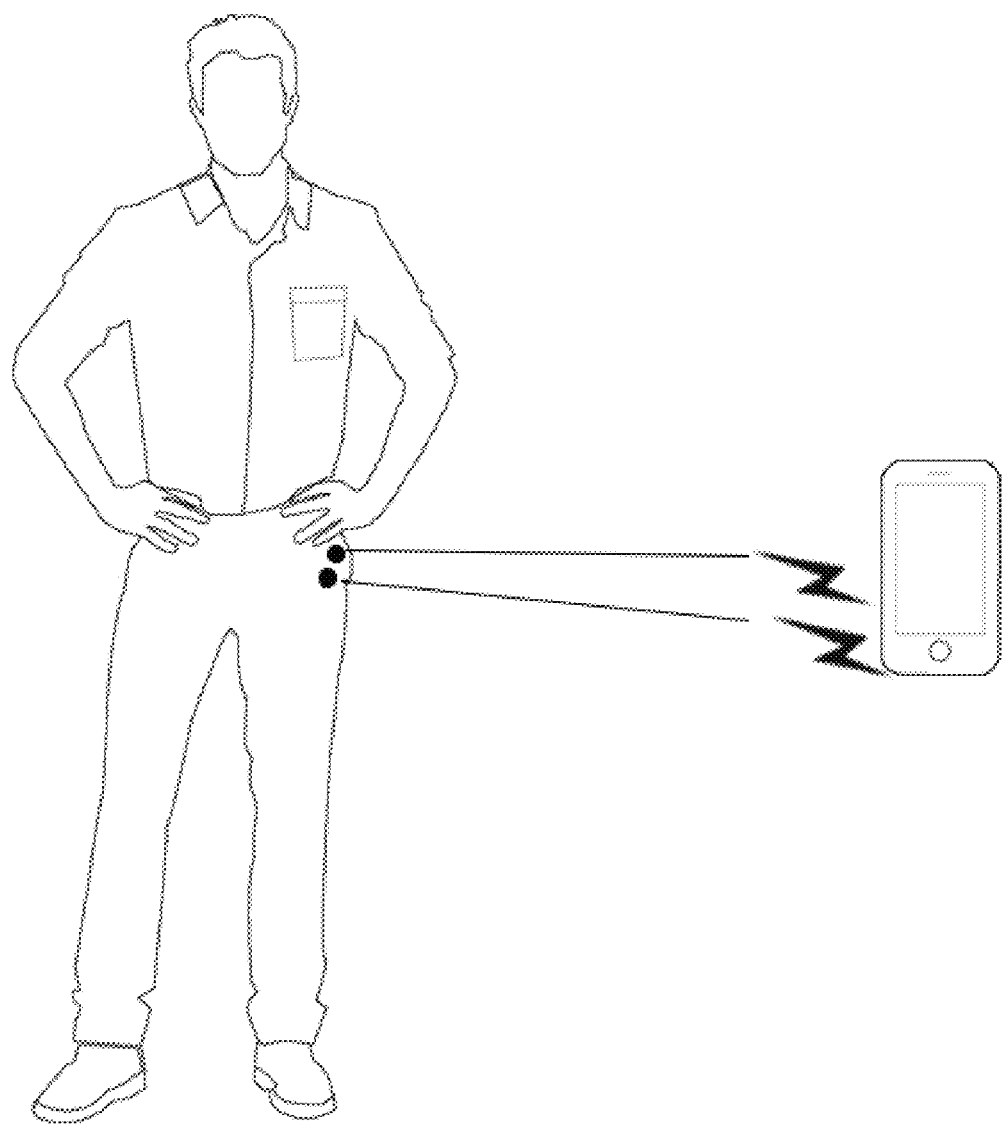
FIG. 7: An object localizer system employing two co-located beacons and one base station.
Figure 8:
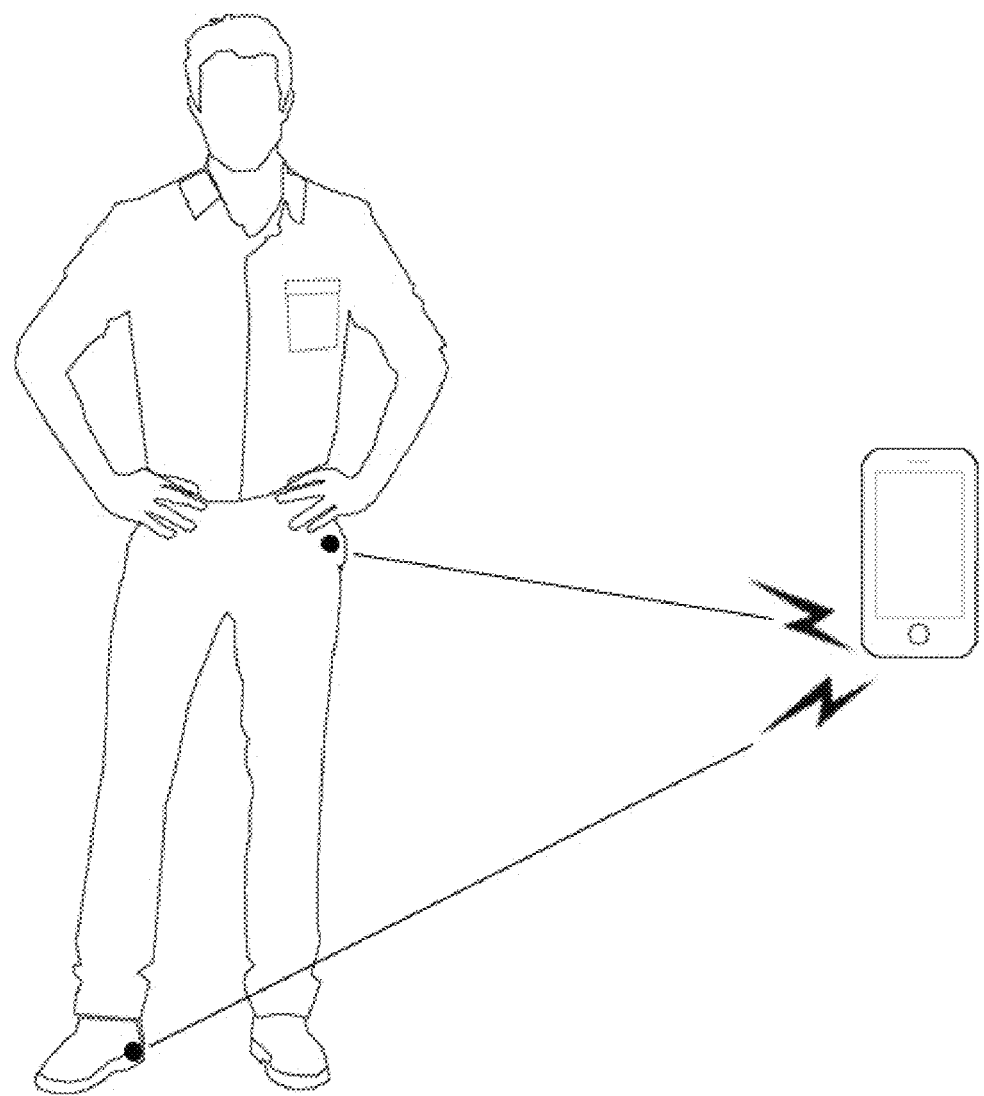
FIG. 8: A localizer scheme employing two beacons worn by the user and one base station.

In an alternative implementation, two or more tags are worn by the user in different parts of the body as illustrated in FIGS. 7-8 and a reference RSSI would be calculated from a combination of RSSI values from these tags before querying the RSSI-distance mapping database. For example, the larger RSSI value from these two could be selected as the reference RSSI to query the mapping database to find corresponding distance.

$$RSSI_{ref} = \max(RSSI_1, RSSI_2)$$

In an alternative implementation, to reduce the effect of noise and fading a time average of RSSI values would be used to calculate RSSI reference values. This scheme may be useful to improve the accuracy of the localization technique.

$$RSSI_{ref} = \underset{t}{\text{AVERAGE}}(RSSI_t)$$

In addition, if active tags selected for implementation, they may optionally use energy harvesting techniques (for example from a solar or motion energy source), to lengthen the battery life.

Figure 9:
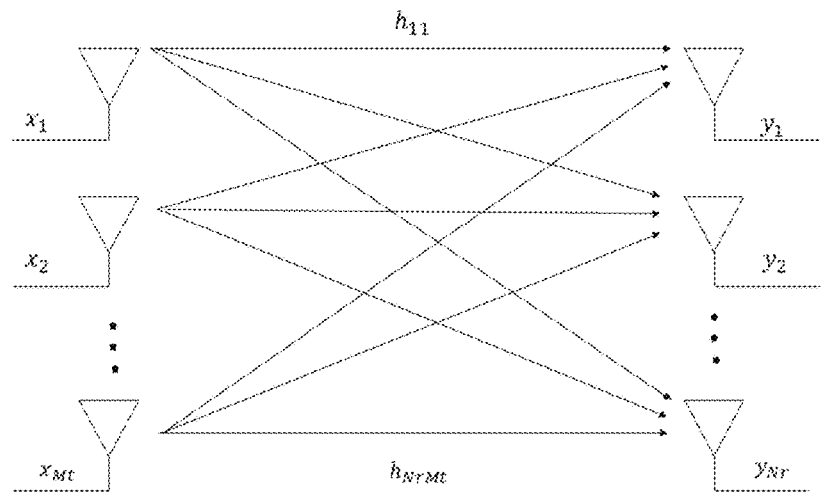
FIG. 9: RSSI matrix calculated for multiple transmitter and receiver antennas.

In another embodiment, the relative distance and location of the tags would be evaluated based on signals transmitted from plurality of transmitter antennas on the RF beacon (or RF tag) to plurality of receiver antennas on the RF tag reader. For example, the RSSI matrix calculated from each signal traveling between each transmitter and each receiver signal may be used to estimate the distance from the center of transmitter antennas to the center of receiver antennas (FIG. 9). This scheme may be useful on mitigating the effect of fading, noise and other uncertainties on RF signals.

Optionally, the same techniques and methods described for localization may be employed using acoustic/sonar transmitters and receivers instead of radio frequency beacons and receivers.

Infrared/proximity/motion/touch/microphone/sonar sensors installed over the faucet and dispenser alongside a radio frequency reader installed in the vicinity of the faucet may be employed to identify who stands behind the faucet, whether the person robbed his/her hands properly during washing or not, if the faucet was open during washing and with what flow strength, if the person uses soap, and how long each process has taken to be completed. They may also be used to change the status of the sensor from sleep to ready (or wakeup) status so as to save energy when no one is around.

Figure 10:
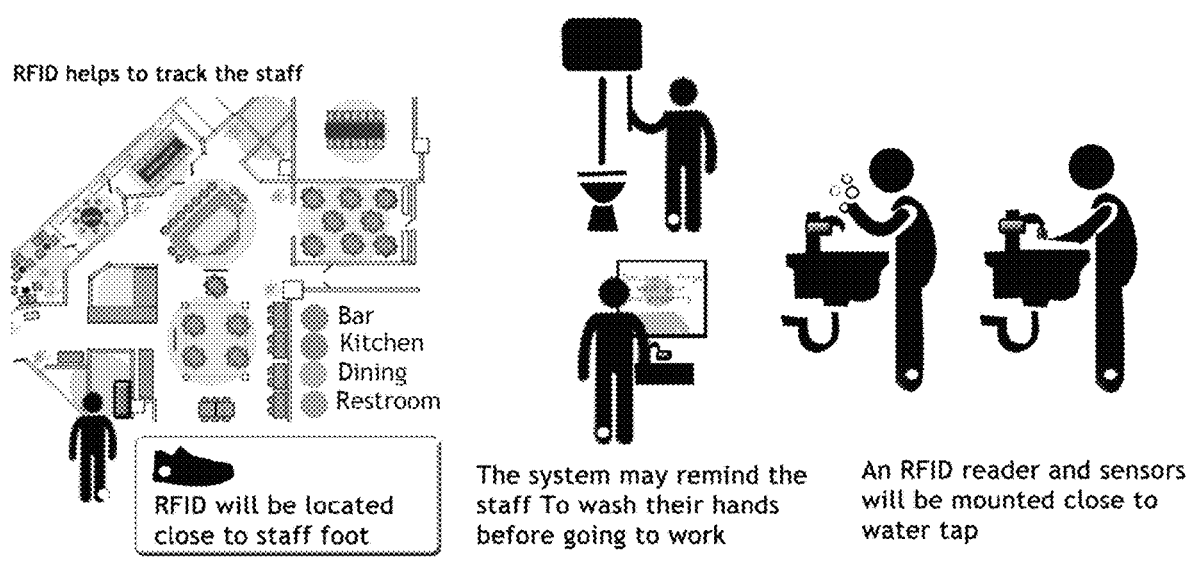
FIG. 10: A detail overview of the washing-hand compliance sub-system

FIG. 10 shows a detailed overview of the washing-hand compliance sub-system.

In one embodiment, the sensors installed over the faucet and dispenser (or the radio frequency readers) may become enabled based on an adjustable duty cycle on a periodic basis. This helps the sensor device to save energy on the sleep cycle as demonstrated in FIG. 3. The duty cycle and period of wakeup-sleep may be different for different types of sensors. In addition, these parameters may adaptively be controlled through a feedback from the device battery. This may help the battery require less frequent charging.

The central monitoring center will group the events based on the received time stamp and interpret the behavior of the staff to extract if he/she has washed their hands after leaving the kitchen and with what quality (quality will be determined from the time the faucet was open, if they robbed their hand properly and if she/he has used dispenser to get soap). The central monitoring unit will then provide alert and report about the level of hand-washing compliance among the employees of each restaurant unit in accordance with hygiene codes dictated by appropriate health organization. The system may optionally log a historical graph of the number of violations by each individual or restaurant unit.

Figure 11:
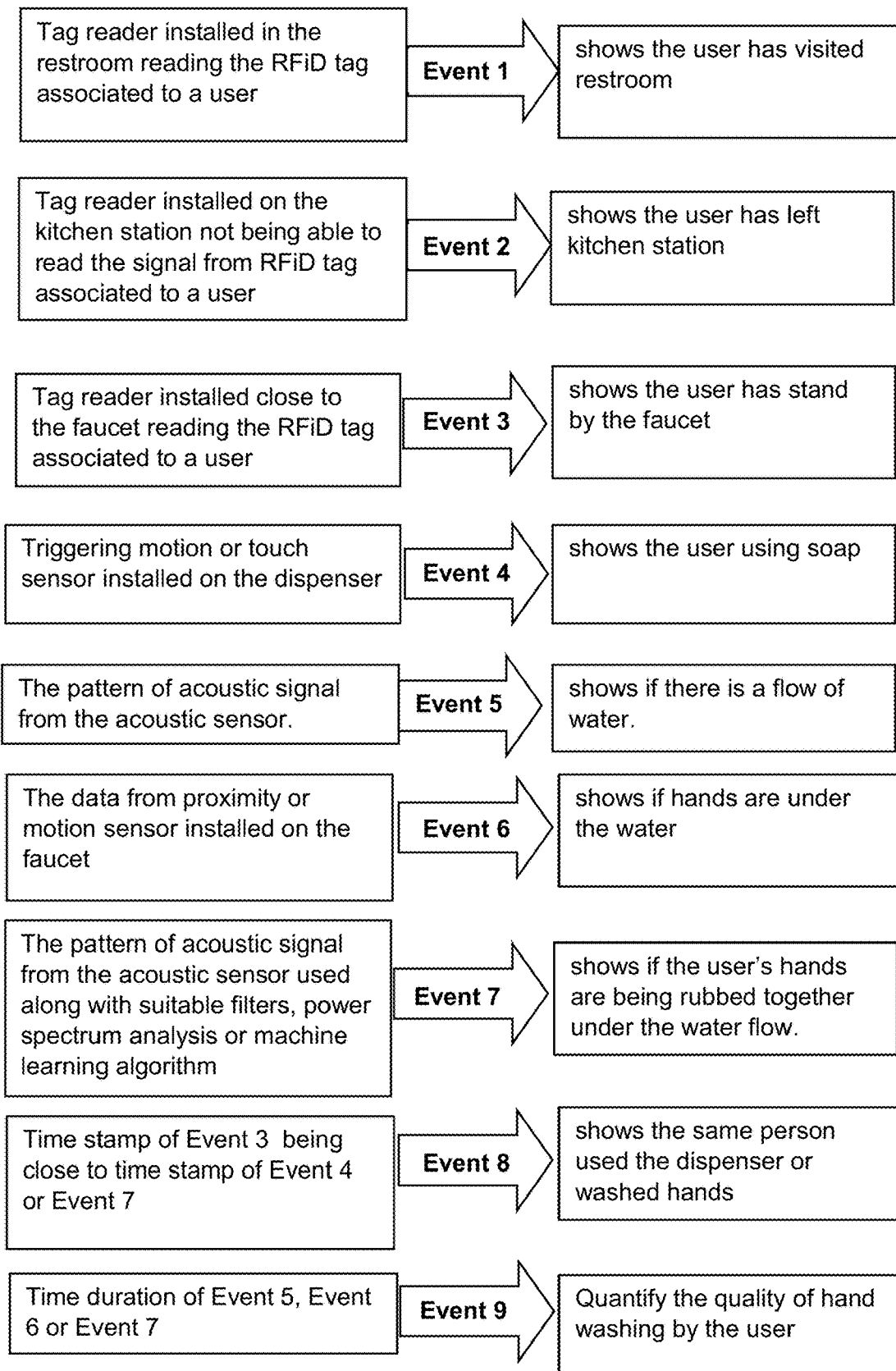
FIG. 11 A relation diagram between washing-hand events and information extracted from sensed data

FIG. 11 shows an example of how information about the employee's hand-washing behavior may be inferred from sensed data by analyzing the signals from the sensors and considering the duration and the sequence of events.

The Internet of Things (IoT) adaptor unit can act as a gateway to collect data and transmit them over mobile wireless network. The mobile network may be one which is compatible with mobile standards such as 5G, 4G, LTE, 3GPP, Bluetooth, BTLE, Zig bee, Glowpan, GPRS, or GSM Edge.

The Internet of Things adaptor may also be compatible with communication standards defined for wireless Local Area Network (LAN), wireless Metropolitan Area Network (MAN), wireless Regional Area Networks (RAN) and/or wireless Broadband Wireless Access (BWA) including different versions of IEEE 802.11, IEEE 802.15, IEEE 802.16, IEEE 802.20 and IEEE 802.22, WiFi, WiMax and etc.

The reports regarding each restaurant unit would be available real-time in franchise headquarters (regardless of their distance from). The system can also provide real-time alerts whenever an employee does not meet their standards. In addition, the system may use internet protocol and applications designed for smartphone, tablets or PCs to provide the manager of each restaurant unit or the corporate managers access to the real-time feedback and reports.

The software applications may be developed using readily available IoT platforms such as ThingSpace, ThingShadow, OpenXC or etc.

The sub-system not only is useful for hygiene control but may optionally provide feedback for staff management. This could be done for example by tracking how much time a staff member spends in different parts of the restaurant and how active they were in serving the customers.

Figure 12:
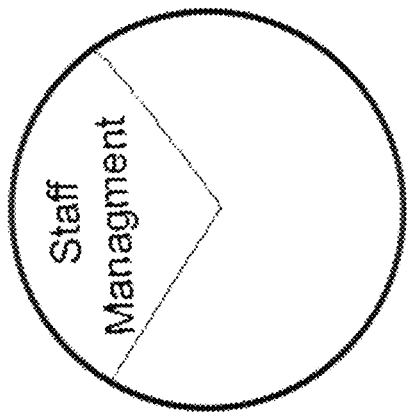
FIG. 12: A front-end hygiene monitoring app designed to display reports and alerts on managers' mobile device about staff location and washing-hand compliance

FIG. 12 illustrates a front-end hygiene monitoring app designed to display reports and alerts on managers' mobile device.

The system may optionally use any other RF enabled tag such as Bluetooth tag instead of RFiD tags. In addition, the system may employ two different types of tags simultaneously to increase accuracy of staff localization. Moreover, a passive or active RFiD tags or one that use energy harvesting, (for example from a solar or motion energy source) may be used depending on the economy of the solution and specific client requirement.

The system optionally may remind the staff to wash their hands after going to restroom, leaving the kitchen station, or upon starting the work shift.

One skillful in the arts knows that similar techniques and apparatus can be used to monitor food safety in any other organization dealing with food preparation or processing including food markets and superstores, catering facilities, food factories, bakeries, fast food chains, day care kitchens, hospital kitchens, nursery kitchens and so on.

D) Automatic Food Labeling Sub-System.

Our system has an automatic food expiration labeling system which can extract staff ID from their radio frequency tag (for example RFiD or Bluetooth tag) and generate the label in an easy, fast way on an in-house label printer.

Figure 13:
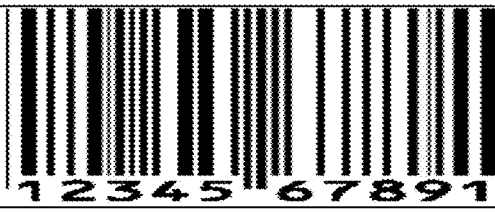
FIG. 13: A sample label generated automatically by reading RF tag worn by the user

The staff may gesture his/her radio frequency tag in front of a tag reader attached to a label printer. The reader will communicate the tag ID to a staff database and extract the name of the person who is opening the new can of food. Then the labeling sub-system will generate a label which contains at least the name of the person, the time and day that the can is opened, and an expiration date for the can as illustrated in FIG. 13.

The expiration date for the can will be calculated from another database based on the type of food in the can. The type of food in the can will be determined by the automatic food labeler either by scanning the bar code of the can and searching it in a large database containing all possible food ingredients in the kitchen, or will be communicated by the user who would select it from a dropdown menu on the system touchscreen (or touchtone) or enter it by pressing buttons on an attached keyboard. Alternatively, the user may pronounce the name of the food in front of a microphone and the system would register it using a speech recognition technique. Optionally, the user may provide the system with the duration that the food will not be expired directly instead of indicating the type of food.

The automatic food labeler may optionally generate a unique bar code on the label. The system may also include a bar code reader and an inventory management system to track the storage and disposal of opened cans and food. In this implementation, the inventory system keeps track of opened cans and their expiration time. The staff will be asked to scan the bar code in the bar code reader before throwing the can in a trash or washing the container. Thus, the inventory management system keep track of the number of opened cans and other containers which are expired or close to expiration and generate a report for the manager. The system may also alert the kitchen or restaurant manager by providing a report about the expired food being kept in the refrigerators. It may also provide them with a list of opened cans or containers that contain foods which are close to be expired. This report helps the restaurant manager to manage usage or disposal of them to avoid spread of fungus and bacteria in the refrigerator. The inventory system may provide the alert or the report to manager's smartphone, tablets or desktop through web services, smart apps or short message service.

In one embodiment, the data of all generated labels will be stored in the central database for further reference.

With our system in place, major elements of organization would be connected through IoT platforms and provide constant feedback about each franchise unit which can be logged and used as a basis for first-tier inspection. Additionally, while it does not replace the necessity of in-person and un-announced inspections, it helps health organizations to have a better view of the food safety situation in each food processing unit on continuous basis.

Figure 14:
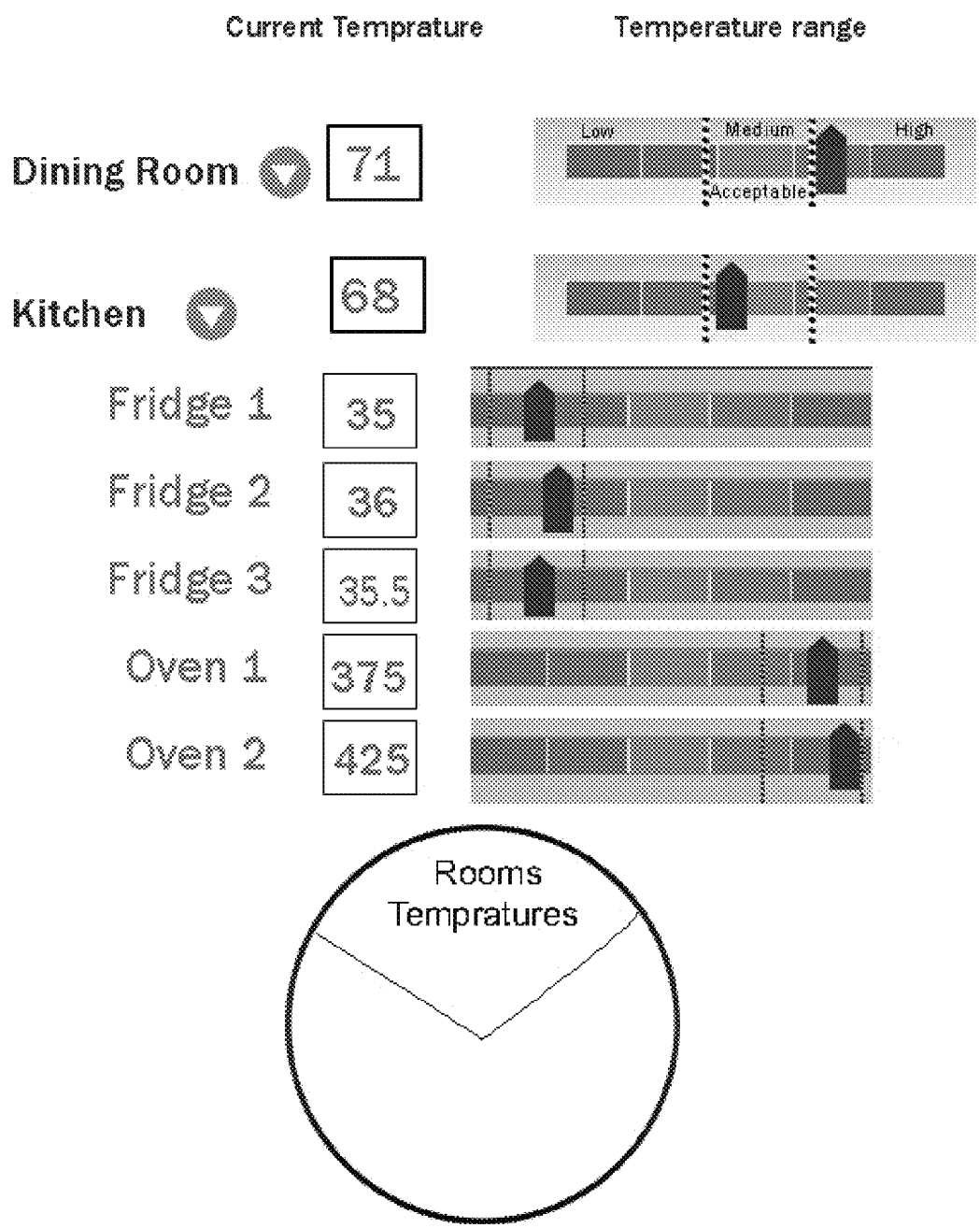
FIG. 14: Combined system of appliances and environment monitoring

FIG. 14 shows an example of a user interface design for combined appliances and environment monitoring system capable of displaying reports and alerts on managers' mobile device.

Another alternative to make an automatic food labeling sub-system especially for deli shelves is a system consisting of a bar code tag unique for the type of food each container carry which is attached to the container, a first database which stores the bar codes along with the shelf life duty (or safe consumption period), a bar code scanner to scan the bar code, an RFiD tags that would be assigned and attached to each opened cans/food container, an RFiD reader to scan the attached RFiD tags of opened cans/food containers, and an inventory management system to track the RFiD tags attached to opened cans/food containers and their status, a second database to store the status of RFiD tags. The RFiD tag status show whether it is activated and attached to an opened can/food container or not. The status also shows whether the opened can is still on the shelf (or refrigerator), and whether it has been fully consumed or thrown away. If it is still on the shelf, the status may further show if it is expired or close to expiration or not. If it is fully consumed it may also document if it is used as a sample or sold.

The system works as below. A user scans the bar code representing the type of food with a bar code reader upon deciding to open it. If inventory management system shows similar type of food has been opened and not fully consumed or thrown away, the system will generate a warning that an opened can/food container of similar type exists in the refrigerator shelf. The system may also report the expected expiration of the existed container along the alert. If the user wishes to proceed, the user may scan an RFiD tag to assign it to that specific can/food container. The user will then attach the RFiD to the opened can/food container. From now on, the system will track the attached RFiD. The system pulls up a safe consumption period from the type of food in the container which has been communicated to it through the bar code reader. The system calculates the expiration date for the food in the food container based on the pulled up safe consumption period and today's date. The system stores the expiration of the opened can along with ID of the attached RFiD tag. In addition, the system may optionally store the date the can is opened and the name of the food.

The user will scan the RFiD with an RFiD tag reader upon disposal of the container/food container/food role to communicate to the inventory management system that the opened can no longer exist in the refrigerator fridge.

The system may optionally have a smart trash consisting of a second RFiD tag reader and a wireless communication transmitter. In this case, the system will automatically track disposal of opened cans/food containers/food roles in the trash can and communicate it to the inventory management system. The trash can may optionally have LCD to ask the user if the disposed can/food container/food role has been fully consumed, or expired or used as a sample. This helps accounting department keep track of profit, overhead and loss in the shop.

In this implementation, the system will keep track of each open container since it's been opened and put in the refrigerator shelf until it is disposed. The system can generate report or alert if an open food container is close to the expiration so that the manager applies price mark down for that product. The system will generate report and alert for all products which are already expired and not disposed from refrigerator yet.

In another embodiment, the system comprises a radio frequency (RF) tag for storing an identifier of an opened food container which will be attached to the opened food container upon opening the food container by a user, an RF tag reader, a processor a radio frequency (RF) tag for storing an identifier of an opened food container which will be attached to the opened food container upon opening the food container by a user, an RF tag reader, a processor, a first database for storing a list of food type and their corresponding food-specific safe consumption period for consuming food stored in the food container after opening the food container, an inventory management system, a second database for storing a list of RF tag identifiers along with expiration date of the food in the corresponding opened food container. When a user decides to open a food container, first activate an RF tag by scanning it with the RF tag reader and communicating the type of food in the container for example through entering it through a keyboard or LCD or by scanning the bar code attached to the can and retrieving its food type from a third database. Then, the system retrieve the corresponding food-specific safe consumption from the first database based on that information. Next, the system automatically generates a set of food expiration information for the food stored in the food container and assign it to the RF tag identifier in the second database. The food expiration information may contain an expiration date calculated based on the retrieved food-specific safe consumption period and a first current date indicating when the food container is being opened by the user.

In another implementation, the RFiDs may be divided into several batches. Each batch represent a predefined safe consumption period which has been pre-defined in the database. Each batch has been visually colored differently so that the user can quickly recognize their pre-defined consumption period. Upon opening a can or food container, the user picks an RFiD from the right batch representing the same safe consumption period as the food inside that container and attach it to the opened can/food container. The inventory management system and smart trash will be used as proposed above to help system track the opened cans/food container in the refrigerator.

The system may optionally be designed open loop. i.e. without any feedback regarding disposal of the opened can. In this system, the system assumes that the user will not open a new can/food container of the same type without finishing or disposing the previous opened ones. Thus, if the bar code scanner scans the same type of food, the system assumes the previous one has been disposed already and the new container replacing it. In addition, the system will generate an alert if an opened can/food container has not been replaced by a new container and its expiration is close. The system may receive the feedback directly from the user if the food container does not exist in the refrigerator.

Similar system for generating automatic food labeling can be implemented using two bar codes. The first bar code is can standard bar code which code the type of food in the container and is attached to the can. Upon scanning the bar code by the user, the system will generate a second bar code including the expiration date calculated from comparing today's date with the safe consumption period stored in the database for that specific food type communicated from the first bar code data. The second bar code is unique to the specific opened can/food container. It will be attached to the opened food container and will be used to track the opened cans/food container. No two opened container may share the same second bar code.

In one embodiment, the user will scan the second bar code in front of the bar code scanner before disposing the opened can/food container in the trash can. As though the system will keep track of opened cans/food container exist in the refrigerator (shelf). The system will generate report from available opened cans/food container and their expiration or may optionally generate alert if a food container is close to expiration. This system does not require to employ any RFiD tag to generate food expiration label or track the list of opened food container in the shelf (refrigerator).

The system may alternatively comprise a bar code tag for storing an identifier of a food type which is attached to a food container, a machine comprising a bar code reader and a processor, a first database for storing a list of bar codes and their corresponding food type; and a second database for storing a list of food type and their corresponding food-specific safe consumption period for consuming food stored in the food container after a user opens the food container. In this embodiment, the machine configured to automatically generate a set of food expiration information for the food stored in the food container when the user scans the bar code with the bar code reader. To do that, the system first retrieve the food type from the first database based on the scanned bar code. Then, it retrieved the corresponding food-specific safe consumption period from the second database. Next, the system uses that information to calculate an expiration date calculated based on a food-specific safe consumption period and a first current date indicating when the food container is being opened by the user. Then, the system automatically generates the food expiration information.

The inventory management system of opened cans/food container may optionally use machine learning algorithm to find patterns regarding consumption of each type of food during specific dates of the year or per specific events. An artificial intelligence algorithm may also be deployed to predict future needs for specific type of food based on consumption patterns, previous consumptions of that food and chronological order so that managers can order it ahead of time to renew inventory. The system may also analyze and linked certain dates or events that demand higher consumption of that specific type of food. The machine learning algorithm may also discover the relation between sampling some type of food and excessive demand for that food.

One skillful in the arts knows that similar techniques and apparatus can be used to generate automatic labels and monitor expiring medicine and medical materials (such as suture threads, anesthesia medicine) in hospitals and health provider facilities. In addition, similar hygiene monitoring techniques and apparatus may be used to monitor and reduce the spread of contamination between units and from health care providers to patients.

The invention claimed is:

1. A hygiene monitoring system comprising:
   a bar code tag for storing an identifier of a food type which is attached to a food container;
   a machine comprising a bar code reader and a processor, wherein the machine is located proximate to a compartment storing the food container,
   a first database for storing a list of bar codes and a food type associated with each bar code-; and
   a second database for storing a list of food types and associated food-specific safe consumption periods for each food type;
   wherein each food-specific safe consumption period specify a period of time to be safe to consume a food of associated food types, if stored in said food container after a user opens said food container
   wherein the machine is configured to automatically generate a set of food expiration information for the food stored in the food container when the user scans the bar code tag with the bar code reader; and,
   wherein said set of food expiration information comprising:
      a specified food type obtained by retrieving the bar code tag of the food container from said first database upon scanning—the bar code tag by the bar code reader; and
      an expiration date calculated based on a food-specific safe consumption period and a first current date indicating when the food container is being opened by the user; and,
      wherein said food-specific safe consumption period is retrieved from said second database based on the specified food type obtained from said first database.

2. The hygiene monitoring system of claim 1, wherein the first and the second database are combined into one database.

3. The hygiene monitoring system of claim 2, further comprising:
   an inventory management system;
   wherein said processor assigns a unique bar code to each food expiration information; and,
   wherein said bar code reader scans said unique bar code upon disposal of each opened food container; and,
   wherein said inventory management system uses the scanned unique bar code to track if the opened food container is disposed.

4. The hygiene monitoring system of claim 1, further comprising a third database for storing said set of food expiration information.

5. The hygiene monitoring system of claim 4, further comprising an inventory management system configured for comparing a second current date to said expiration date as retrieved from said set of food expiration information, wherein if said second current date exceeds said expiration date, said opened food container is considered to have expired.

6. The hygiene monitoring system of claim 5, wherein said inventory management system is further configured to generate an alert if said opened food container is considered to have expired.

7. The hygiene monitoring system of claim 4, further comprising an inventory management system configured to keep track of opened food containers in a refrigerator and expiration date corresponding to each opened food container.

8. The hygiene monitoring system of claim 7, further configured to generate a report of the opened food container having expiration date which is sooner than a specified date in future.

9. The hygiene monitoring system of claim 4 further comprising:
   a label printer configured for producing a hardcopy of said set of food expiration information;
   a bar code reader;
   an inventory management system;

wherein said set of food expiration information further comprising a unique bar code assigned to each food expiration information to identify said opened food container; and, wherein said bar code reader scans said unique bar code upon disposal of each opened food container; and, wherein said inventory management system uses the scanned unique bar code from said bar code reader along with the data stored in said second database to keep track of opened food containers currently available in a compartment storing food containers and their corresponding expiration date.

10. The hygiene monitoring system of claim 9,
wherein said inventory management system is further configured to generate an alert if said opened food container is considered to have expired.

11. The hygiene monitoring system of claim 1, further comprising a label printer configured for producing a hardcopy of said set of food expiration information.

12. A hygiene monitoring system comprising:
a radio frequency (RF) tag for storing an identifier of an opened food container which will be attached to the opened food container upon opening the food container by a user;
a machine comprising an RF tag reader and a processor, wherein the machine is located proximate to a compartment storing a food container,
a first database for storing a list of food types and food-specific safe consumption period corresponding to each food type for consuming food of such food type stored in the food container after opening the food container, and
a second database for storing a list of RF tag identifiers along with expiration date of the food in the corresponding opened food container;
wherein said processor is configured to automatically generate a set of food expiration information for the food stored in the food container when the user scans the RF tag of the opened food container with the RF tag reader, and
wherein said set of food expiration information comprising:
an expiration date calculated based on a food-specific safe consumption period from said list of food type and a first current date indicating when the food container is being opened by the user; and
wherein said food-specific safe consumption period is retrieved from said first database based on a specified food type communicated to the processor by the user; and
wherein the processor updates the identifier of the scanned RF tag and the calculated expiration date into the second database.

13. The hygiene monitoring system of claim 12, wherein the second database further stores food type in the corresponding opened food container along with the RF tag identifier; and wherein the processor further updates the specified food type into the second database.

14. The hygiene monitoring system of claim 12, further comprising an Liquid Crystal Display (LCD) touchscreen configured to receive an input indicating said specified food type.

15. The hygiene monitoring system of claim 12, further comprising a microphone configured for receiving an input indicating said specified food type.

16. The hygiene monitoring system of claim 15, wherein the input indicating said specified food type is a speech signal; and
wherein said processor uses speech recognition techniques to identify said specified food type from the speech signal.

17. The hygiene monitoring system of claim 12, wherein said RF tag is a Bluetooth tag.

18. The hygiene monitoring system of claim 12,
wherein said RF tag reader is further capable of receiving the transmitted RF signal from the RF tag, and estimating its approximate distance from the RF tag;
wherein the generation of said set of food expiration information is triggered when the approximate distance of the RF tag from the RF tag reader is less than a preset value.

19. A hygiene monitoring system comprising:
a radio frequency (RF) tag transmitting an RF signal and storing an identifier of a user;
an RF tag reader capable of receiving the transmitted RF signal from the RF tag, retrieving the identifier of the user from the transmitted RF signal, and estimating a distance between the RF tag reader and the RF tag;
a first database for storing a list of users and corresponding identifier of each user of said list of users;
a second database for storing a list of food types and corresponding food-specific safe consumption period of each food type which specify a period of time to be safe to consume a food of such food type if stored in a food container after any person opens said food container;
a processor configured to generate a set of food expiration information for an opened food container, said set of food expiration information comprising information obtained by retrieving the identifier of the user from said first database upon functional detection of said RF tag by said RF tag reader and by calculating an expiration date based on a specified food-specific safe consumption period and a first current date;
wherein said specified food-specific safe consumption period is retrieved from said second database based on a specified food type communicated by the user to said processor; and
wherein the generation of said set of food expiration information is triggered when the distance of the RF tag from the RF tag reader gets closer than a preset value.

* * * * *